US010792137B2

United States Patent
Dai et al.

(10) Patent No.: US 10,792,137 B2
(45) Date of Patent: Oct. 6, 2020

(54) DEVICE WITH CONTROLLABLE SWITCH TERMINAL VOLTAGE

(71) Applicant: SHANGHAI SHIFT ELECTRICS CO., LTD., Shanghai (CN)

(72) Inventors: Xiaoguo Dai, Shanghai (CN); Zhenwu Xu, Shanghai (CN)

(73) Assignee: Shanghai Shift Electrics Co., Ltd., Shanghai (CN)

( * ) Notice: Subject to any disclaimer, the term of this patent is extended or adjusted under 35 U.S.C. 154(b) by 1031 days.

(21) Appl. No.: 15/302,250

(22) PCT Filed: Apr. 9, 2014

(86) PCT No.: PCT/CN2014/075014
§ 371 (c)(1),
(2) Date: Feb. 28, 2017

(87) PCT Pub. No.: WO2015/154264
PCT Pub. Date: Oct. 15, 2015

(65) Prior Publication Data
US 2017/0135791 A1    May 18, 2017

(51) Int. Cl.
*A61C 17/22*     (2006.01)
*H03K 17/0814*    (2006.01)
(Continued)

(52) U.S. Cl.
CPC .......... *A61C 17/221* (2013.01); *A61C 17/26* (2013.01); *H02H 5/083* (2013.01); *H03K 17/08142* (2013.01); *A46B 15/0004* (2013.01)

(58) Field of Classification Search
CPC .......... A61C 17/221; A61C 17/26; H03K 17/08142; H02H 5/083; A46B 15/0004
See application file for complete search history.

(56) References Cited

U.S. PATENT DOCUMENTS

| | | | |
|---|---|---|---|
| 6,683,535 B1 * | 1/2004 | Utke | G01M 3/045 200/61.04 |
| 7,012,400 B2 * | 3/2006 | Yu | H02P 7/288 318/461 |

(Continued)

FOREIGN PATENT DOCUMENTS

| | | | |
|---|---|---|---|
| CN | 2667831 Y | * | 12/2004 |
| CN | 2667831 Y | | 12/2004 |

(Continued)

OTHER PUBLICATIONS

European Patent Application No. 14888932.2; Decision to Grant; dated Feb. 7, 2019; 3 pages.

*Primary Examiner* — Pinping Sun
(74) *Attorney, Agent, or Firm* — BakerHostetler

(57) ABSTRACT

A device with controllable switch terminal voltage, comprising: a switch signal unit for outputting a corresponding switch signal according to the state of a switch, wherein the switch is coupled between the switch signal unit and an output of a power supply; a biasing unit coupled to the switch signal unit for outputting a bias voltage to the switch signal unit; wherein when the switch is open and a conductive liquid and/or the stream of conductive liquid exists inside the switch, the biasing unit cooperates with the switch signal unit so as to control the terminal voltage of the switch and the current flowing through the switch. The disclosed switch design allows the switch terminal voltage to be less than 1V when the switch is opened, which greatly depresses the electrochemical reaction of the switch, thus prolonging the switch life, and avoiding the possibility of hydrogen explosion.

18 Claims, 3 Drawing Sheets

(51) Int. Cl.
*H02H 5/08* (2006.01)
*A61C 17/26* (2006.01)
*A46B 15/00* (2006.01)

(56) References Cited

U.S. PATENT DOCUMENTS

| | | | | |
|---|---|---|---|---|
| 7,990,670 | B2* | 8/2011 | Chen | H02H 5/083 |
| | | | | 137/78.3 |
| 8,898,843 | B2* | 12/2014 | Okazaki | A61C 17/221 |
| | | | | 15/105 |
| 2006/0061217 | A1* | 3/2006 | Makino | H01H 9/547 |
| | | | | 307/139 |
| 2006/0208914 | A1* | 9/2006 | Liu | H04M 1/18 |
| | | | | 340/620 |
| 2010/0033883 | A1* | 2/2010 | Simon | H02H 5/083 |
| | | | | 361/52 |
| 2011/0138551 | A1* | 6/2011 | Stopler | A61C 17/221 |
| | | | | 15/22.1 |
| 2015/0372479 | A1* | 12/2015 | Xia | H02H 5/083 |
| | | | | 307/118 |

FOREIGN PATENT DOCUMENTS

| | | | | |
|---|---|---|---|---|
| CN | 201063594 | Y | 5/2008 | |
| CN | 201234158 | Y | 6/2009 | |
| CN | 103066978 | A | 4/2013 | |
| CN | 202917966 | U | 5/2013 | |
| CN | 103199835 | A | 7/2013 | |
| CN | 103929164 | A | 7/2014 | |
| CN | 203859734 | U | 10/2014 | |
| EP | 2117095 | A1 * | 11/2009 | H02H 5/083 |
| EP | 2117095 | A1 | 11/2009 | |
| EP | 3131203 | B1 | 3/2019 | |
| KR | 20010111820 | A | 12/2001 | |

* cited by examiner

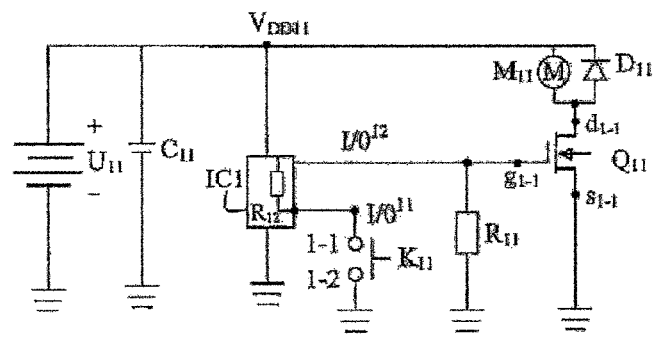
Fig.1
(Prior Art)
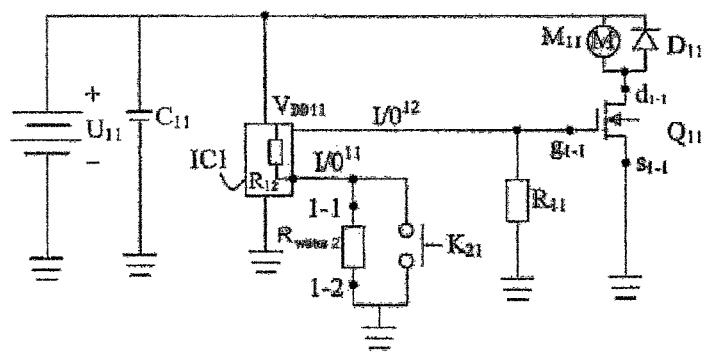
Fig.2
(Prior Art)
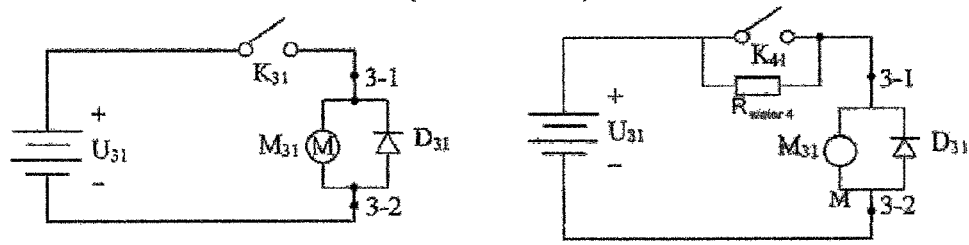
Fig.3
(Prior Art)
Fig.4
(Prior Art)

DEVICE WITH CONTROLLABLE SWITCH TERMINAL VOLTAGE

BACKGROUND

The present invention generally relates to the field of household circuits, and more particularly, to a device capable of effectively reduce the switch terminal voltage in a wet environment.

A switch is usually used to activate or deactivate the electrical appliances, and can also be used to select different modes of operation of the electrical appliances, in a sense, the switch are devices for achieving the contact between people and electrical appliances. There are currently a lot of electrical appliances comprising rechargeable batteries or dry batteries etc. as their power supply, thus the electrical appliances have power supplies of an output voltage greater than 1V, however, the electrical appliances available on the market usually have a switch terminal voltage approximately equal to or greater than the output voltage of the power supply.

It is well known that electrical appliances, such as electric toothbrushes, shaving devices or hair removing devices, are frequently placed in the moist toilet, and during their use or cleaning process, are likely to have access to a variety of aqueous solutions. The aqueous solution is typically conductive, and when the watertight seal of an electrical appliance goes wrong, such an aqueous solution could cause the space between the contacts inside the switch having potential difference to be subjected to conductive aqueous solution or stream of the conductive aqueous solution or a mixture of the conductive aqueous solution and the stream of the aqueous solution, but such a conductive liquid or gas or a mixture of liquid and gas would occur an electrochemical reaction under the action of the above switch terminal voltage, and this kind of electrochemical reaction would corrode the switch and thus cause switch failure.

Therefore, it is desired to provide a circuit that makes the switch suitable for the wet environment while providing a higher stability and safety.

SUMMARY

To solve the above problems, the present invention proposes a device with controllable switch terminal voltage capable of stable operation in wet conditions with high safety.

One aspect of the present invention proposes a device with controllable switch terminal voltage comprising: a switch signal unit for outputting a corresponding switch signal according to the state of a switch, wherein the switch is coupled between the switch signal unit and an output of a power supply; a biasing unit coupled to the switch signal unit for outputting a bias voltage to the switch signal unit; wherein when the switch is open and a conductive liquid and/or the stream of a conductive liquid exist(s) inside the switch, the biasing unit cooperates with the switch signal unit so as to control the terminal voltage of the switch and the current flowing through the switch.

Preferably, the switch signal unit comprises a first transistor; the switch is coupled between the first transistor and the power supply for controlling the close-open of the current path between the first transistor and the power supply.

Preferably, the first transistor is a bipolar transistor, one terminal of the switch is coupled to the emitter of the first transistor, wherein the switch is coupled in series with the PN junction between the emitter and base of the first transistor so as to form a first series circuit, the first series circuit being coupled in parallel with the upper bias part of the biasing unit; or the switch is coupled in series with the NP junction between the emitter and base of the first transistor so as to form a second series circuit, the second series circuit being coupled in parallel with the lower bias part of the biasing unit.

Preferably, the first and second series circuits further comprise at least one resistor.

Preferably, when the switch is opened, if a conductive liquid and/or the stream of a conductive liquid exist(s) inside the switch, the first transistor is in a turn-on state; or if the inside of the switch is dry, the first transistor is in a turn-off state.

Preferably, the device further comprises an electrical motor coupled to the output of the switch signal unit.

Preferably, the device further comprises an output module comprising a second transistor and an electrical motor coupled in series with the second transistor; wherein the output module is coupled to the output of the switch signal unit, and the operation state of the electrical motor is configured based on the output signal from the switch signal unit.

Preferably, at least one pull-up resistor is coupled in series between the output of the switch signal unit and the low level.

Preferably, the circuit further comprises a signal analysis module coupled between the output module and the output of the switch signal unit, so as to output the control signal for controlling the output module according to the output signal from the switch signal unit.

Preferably, the second transistor is a field effect transistor, wherein the electrical motor is coupled in series to the dram of the second transistor.

Preferably, the second transistor is a bipolar transistor, wherein the electrical motor is coupled in series to the collector of the second transistor.

Preferably, the first transistor is a field effect transistor, and one terminal of the switch is coupled to the source of the first transistor, wherein the switch is coupled in series with the NP junction between the gate and source of the first transistor so as to form a first series circuit, the first series circuit being coupled in parallel with the upper bias part of the biasing unit; the switch is coupled in series with the PN junction between the gate and source of the first transistor so as to form a second series circuit, the second series circuit being coupled in parallel with the lower bias part of the biasing unit.

Another aspect of the present invention proposes an electric toothbrush comprising a brush head coupled to the electrical motor; the electrical motor determines whether to drive the brush head to operate according to the control of the switch.

By adopting the technical solution of the present invention, it is possible to make the switch terminal voltage to be less than 1V when the switch is opened, which greatly depresses the electrochemical reaction of the switch, thus prolonging the switch life, and avoiding the possibility of hydrogen explosion.

BRIEF DESCRIPTION OF THE DRAWINGS

A better understanding of the present invention will be available after referring to the description of embodiments of the present invention made in conjunction with the accompanied drawings, and further purpose, details, features and advantages of the present invention will become even more apparent, in which:

FIG. 1 is a schematic diagram of an application circuit of the trigger switch in prior art;

FIG. 2 is an equivalent circuit diagram when the inside of the switch of FIG. 1 has an aqueous solution;

FIG. 3 is a schematic diagram of a typical power switch circuit in prior art;

FIG. 4 is an equivalent circuit diagram when the inside of the switch shown in FIG. 3 has an aqueous solution;

DETAILED DESCRIPTION

Figure 5:
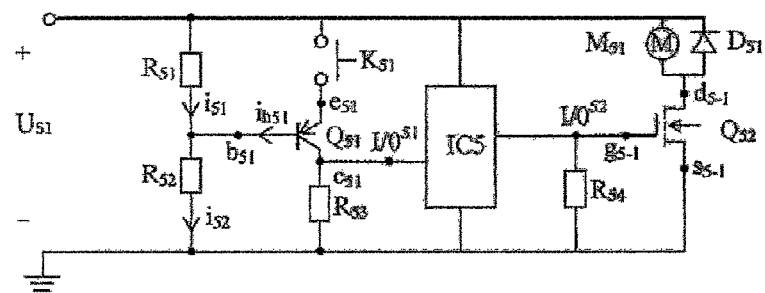
FIG. 5 is a schematic diagram of a circuit for reducing the switch terminal voltage according to an embodiment of present invention.

The preferred embodiments of the present disclosure will be described below in more detail by reference to the accompanying drawings. Although the drawings has shown preferred embodiments of the present disclosure, it should be appreciated that the present disclosure can be achieved in various ways rather than being restricted by the embodiments set forth herein. On the contrary, the provision of these embodiments is merely for the purpose of an even thorough and full understanding of the present disclosure, and also can present the complete scope of the present disclosure to the skilled in the art.

The skilled in the art can understand that the conductive aqueous solution, the stream of the aqueous solution or their mixture would cause similar electrochemical reaction and equivalent circuit when the same exits inside the switch, therefore, this embodiment analysis the case in which only the conductive aqueous solution exits inside the switch, and the analysis results are equally applicable to the case of the stream of conductive aqueous solution or the mixture of the conductive aqueous solution and the stream of the aqueous solution existing inside the switch. In this embodiment, an object with equivalent resistance less than 1 MΩ is defined as a conductive object.

FIG. 1 is a schematic diagram of an application circuit of the trigger switch in prior art. The skilled in the art can understand that, when the switch K11 is opened, the voltage at the switch K11 is equal to VDD11, and then to the output voltage U11 of the power supply, but for most of the electrical appliances, the output voltage U11 of the power supply is usually greater than 1V, and in this embodiment, U11 is equal to 3V.

The analysis of the operating principle of the circuit of FIG. 1 is as follows:

(1) The Switch Being in the Dry Air

When the switch $K_{11}$ is opened, the port I/O$^{11}$ of the signal processing module IC1 is not coupled with the low level (ground), thus the port I/O$^{11}$ is at a high level, and the port I/O$^{12}$ outputs a low level, the electrical motor $M_{11}$ is disabled to operate. When the user pushes down the switch $K_{11}$ for a time period greater than 100 ms, the switch $K_{11}$ directly shorts the port I/O$^{11}$ to the low level, that is to say, the port I/O$^{11}$ is suddenly dropped from the high level to the low level, then IC1 senses the abrupt change of level of I/O$^{11}$, and determines that the switch has been triggered, thus a high level is output at the port I/O$^{12}$ so as to drive the field effect transistor $Q_{11}$ to operate and then drive the drive motor $M_{11}$ to operate.

When the electrical motor runs and the user releases the switch, the level at the port I/O$^{11}$ is restored to a high level from the low level, such a process is recognized by IC1 as a process that the switch is released, thus the current operation state of the electrical motor is not changed, and the operation of the electrical motor is maintained. When the switch $K_{11}$ is again pushed down for more than 100 ms, that is, the I/O$^{11}$ level is again abruptly changed from a high level to a low level, IC1 recognizes that the switch is triggered once again, thereby a low level is output at the port I/O$^{12}$ and then the field effect transistor $Q_{11}$ is turned off, so that the electrical motor $M_{11}$ is stopped. The processes are cycled in this way to repeat the operation.

Assuming $V_{DD}$ is a power supply voltage for IC1, in this embodiment, the high level is defined as being greater than or equal to 0.7 times of $V_{DD}$, and the low level is defined as being less than or equal to 0.3 times of $V_{DD}$. Apparently, when the level at the port is between 0.3 $V_{DD}$ and 0.7 $V_{DD}$, IC1 cannot determine whether such a level is a high level or a low level. Usually, a pull-up resistor $R_{12}$ of about 100 KΩ is coupled in series between I/O$^{11}$ and $V_{DD}$ inside IC1 (as shown in FIG. 1), that is to say, I/O$^{11}$ and $V_{DD}$ are coupled with each other through the pull-up resistor.

When a conductive aqueous solution exists inside the switch of the electrical appliances due to poor seal of the electrical appliances, the switch $K_{11}$ is equivalent to an ideal switch $K_{21}$ and an equivalent resistance $R_{water\ 2}$ in parallel. FIG. 2 is a equivalent circuit diagram of FIG. 1 when the inside of the switch has an aqueous solution.

Conductive aqueous solution corresponds to the electrolyte, both positive and negative poles of the switch with terminal voltage and the electrolyte constitute an electrolytic system. According to electrochemical theory, the theoretical decomposition voltage of water is 1.23V, that is, when the switch terminal voltage is greater than 1.23V, water is likely to release hydrogen at the negative pole, but to release oxygen at the positive pole. The mixing of the hydrogen and oxygen in a relatively closed space is risky, when the volume of hydrogen mixed into the air is 4% to 74.2% of the total volume, the spark occurred when the electrical motor operates can detonate the hydrogen, thereby damaging the electrical appliances or causing more serious security incidents.

In addition, even if the switch terminal voltage is less than 1.23V, electrolysis still exists due to the conductivity of the aqueous solution. Such an electrolysis process would oxidize and passivate the metal at the positive pole, so that the conductivity of the positive pole gets poor and thus causes poor contact between the positive and negative poles of the switch when the positive and negative poles contact, and then causing switch failure and the shortening life of the switch. Obviously, the greater the switch terminal voltage is, the more serious the electrolysis effect is, therefore, the switch failure will occur increasingly faster.

The power supply voltage of the electrical appliances is generally greater than 1.0V, and in typical applications of the battery supply, the power supply voltage is 1.2V, 1.5V, 2.4V and 3V. Therefore, the typical circuits available on the market presently have the above analyzed risk.

According to electrochemical theory, the equivalent resistance $R_{water\ 2}$ is related to the electrolysis extent of the aqueous solution, that is to say, when the electrolysis of the aqueous solution is just started, less ions exist in the aqueous solution and its conductivity is poor, therefore the equivalent resistance $R_{water\ 2}$ is relatively greater, in this embodiment, experiment proves that the $R_{water\ 2}$ at this point is approximately equal to 100 KΩ. When the electrolysis goes on for a certain time period, the ion in the aqueous solution increases and its conductivity is also enhanced, the equivalent resistance $R_{water\ 2}$ is relatively decreased, and the experiment proves that $R_{water\ 2}$ at this point is approximately equal to 40 KΩ.

With the voltage distribution of the branch $U_{11}$-$R_{12}$-$K_{21}$ of FIG. 2, a voltage relationship can be derived as shown in expression (1):

$$\begin{cases} U_{11} = U_{R12} + U_{K21} \\ U_{R12} = i_{21} \cdot R_{12} \\ U_{K21} = i_{21} \cdot R_{water2} \end{cases} \quad (1)$$

Where $R_{12}$ is preset to be 100 KΩ, $U_{11}$ is the power supply voltage which is the sum of the voltage of the resistor $R^{12}$ and the voltage of the switch $K_{21}$, $U_{K21}$ is the voltage across the switch $K_{21}$, $U_{K12}$ is the voltage of the pull-up resistor $R_{12}$ inside IC, $I_{21}$ is the current flowing through the resistors $R_{12}$ and $R_{water\ 2}$.

As can be seen from expression (1), when $R_{12}=R_{water\ 2}$, the voltages across the switch $U_{K21}=0.5U_{11}\approx 0.5V_{DD11}$. Therefore, it is difficult to for IC1 to determine whether the level of I/O$^{11}$ is a high level or a low level. When the user presses the switch and the level of the I/O$^{11}$ abruptly changes from $0.5V_{DD11}$ to a low level, since IC1 can recognize that the initial level of I/O$^{11}$ is low, IC1 determines that the switch-pressing at this time is an invalid pressing, IC1 cannot start the electrical motor to operate. At this point, user can determine the switch failure.

When $R_{12}$=100KΩ, $R_{water\ 2}$=40KΩ and substituting the same into the expression (1), it can be seen that $U_{K21}=0.286U_{11}\approx 0.286\ V_{DD11}$. At this point, the level of I/O$^{11}$ is 0.286 $V_{DD11}$, and IC1 determines that the level of I/O$^{11}$ is low. In a similar way, at this point, even if the user presses on the switch, the electrical motor can not be started to operate.

In general, due the switch terminal voltage being greater than 1.0V the equivalent resistance of the aqueous solution across the switch can directly influence the function of the switch, and can also cause switch failure. In addition, in an electrolysis process for a longer time, a large quantity of free electric conductors would be produced inside the switch. Due to the small gap between the positive and negative poles of the switch, these free electric conductors could sometimes short the positive and negative poles of the switch, resulting in short circuit of the switch and thereby causing switch failure.

In view of the above, when the switch is in an open state, it will be directly subjected to a power supply voltage greater than 1V, once a conductive aqueous solution and/or stream of the aqueous solution exists inside the switch, there is a risk that the hydrogen and oxygen will mix and explode and there are various problems of switch failure.

FIG. 3 is a schematic diagram of a typical power switch circuit in prior art, FIG. 4 is an equivalent circuit diagram when the inside of the switch of FIG. 3 has an aqueous solution.

Obviously, when the switch $K_{31}$ is open, the voltage of the switch $K_{31}$ is equal to the power supply voltage $U_{31}$, but $U_{31}$ is always greater than 1V. In this embodiment, $U_{31}$ is equal to 3V.

A brief analysis of the operating principle of the circuit of FIG. 3 is as follows:

(1) When the switch $K_{31}$ is in the dry air, the equivalent resistance at the switch $K_{31}$ is infinite, so the operation state of the circuit depends on the state of the switch $K_{31}$.

(2) When the switch $K_{31}$ is in a wet environment, the switch $K_{31}$ is equivalent to an ideal switch $K_{41}$ and an equivalent resistance $R_{water\ 4}$ in parallel.

In a similar way, when the voltage across the switch $K_{31}$ is large, once conductive aqueous solution and/or stream of the aqueous solution exist(s) inside the switch, there is a risk that the hydrogen and oxygen will mix and explode as well as various problems of switch failure.

Figure 7:
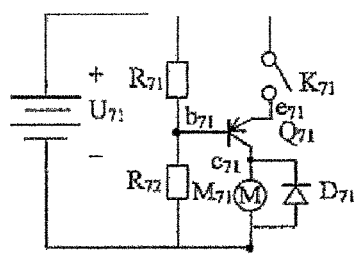
FIG. 7 is a schematic diagram of another circuit for reducing the switch terminal voltage according to an embodiment of present invention.
Figure 9:
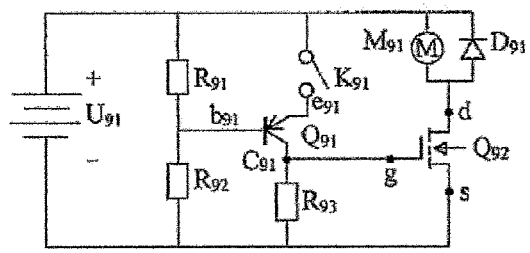
FIG. 9 is a schematic diagram of another circuit for reducing the switch terminal voltage according to an embodiment of present invention.

The present invention enables at least one PN or NP junction of a transistor being coupled in series on the current path from a switch to a power supply, particularly as shown in FIGS. 5, 7 and 9, one terminal of the switch is coupled to the emitter of a first transistor, the switch is coupled in series with the NP junction between the base and emitter of the first transistor, constituting a first series circuit, and the first series circuit is coupled in parallel with the upper bias part of the biasing circuit of the first transistor. It could be appreciated that the first series circuit can also comprise an appropriate resistor, which is to say, the switch and the NP junction between the base and emitter of the first transistor and the appropriate resistor constitute the first series circuit. The above mentioned upper bias part of the biasing circuit is a part of the biasing circuit electrically connecting the base of the first transistor and the positive pole of the power supply.

Figure 10:
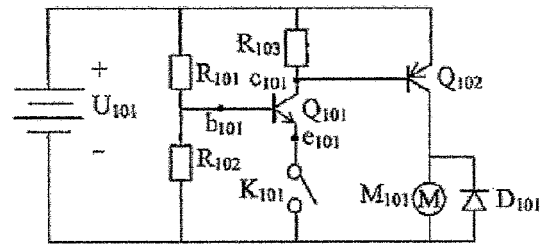
FIG. 10 is a schematic diagram of another circuit for reducing the switch terminal voltage according to an embodiment of present invention.

Accordingly, when the first transistor is altered in its type, for example, as shown in FIG. 10, one terminal of the switch is coupled to the emitter of the first transistor, the switch is coupled in series with the PN junction between the base and emitter of the first transistor to constitute a second series circuit, and the second series circuit is coupled in parallel with the lower bias part of the biasing circuit of the first transistor. In a similar way, the second series circuit can also comprise an appropriate resistor, which is to say, the switch, the PN junction between the base and emitter of the first transistor and the appropriate resistor constitute the second series circuit. The above mentioned lower bias part of the biasing circuit is a part of the biasing circuit electrically connecting the base of the first transistor and the negative pole of the power supply.

The upper (or lower) biasing circuit coupled in parallel with the above first (or second) series circuit must has its voltage less than the power supply voltage. Obviously, the sum of the switch terminal voltage and the voltage between the emitter and base of the first transistor is equal to the voltage of the corresponding upper (or lower) biasing circuit. Therefore, the switch terminal voltage is the difference between the voltage of the corresponding upper (or lower) biasing circuit and the voltage between the emitter and base of the first transistor, thus by rationally configuring the biasing circuit of the first transistor and the type of the first transistor, it is possible to set the switch terminal voltage to be less than 1V and greater than 0V when the switch is opened and a conductive aqueous solution exists inside the switch.

An even more detailed analysis is as follows:

When the switch is opened, since one terminal of the switch having conductive aqueous solution is coupled to the emitter of the first transistor, if the first transistor is not turned on, no current will flow through the emitter of the first transistor, that is to say, no current passes through the ideal switch and the equivalent resistance of the switch, thus the switch terminal voltage is zero. Obviously, at this point, the voltage of the corresponding upper (or lower) biasing circuit is less than or equal to the threshold voltage of the PN (or NP) junction between the emitter and base of the first transistor, which is to say, even if the switch is closed, the first transistor still cannot be effectively turned on, and the electrical motor cannot operate, therefore, the biasing of the biasing circuit is not available.

For the purpose of the transistor being effectively turned on when the switch is closed, the voltage of the corresponding upper (or lower) biasing circuit can be set to be greater than the threshold voltage of the PN (or NP) junction between the emitter and base of the transistor. When the voltage of the corresponding upper (or lower) biasing circuit is greater than the threshold voltage of the PN (or NP) junction between the emitter and base of the transistor, the switch terminal voltage is the difference between the voltage of the corresponding upper (or lower) biasing circuit and the voltage between the emitter and base of the first transistor, and the switch terminal voltage is greater than 0V. When the switch is opened and a conductive aqueous solution exists inside the switch, the first transistor, having its emitter coupled with one terminal of the switch, is in a turn-on state, moreover, due to the switch terminal voltage being the difference between the voltage of the corresponding upper (or lower) biasing circuit and the voltage between the emitter and base of the first transistor, that is to say, the voltage of the corresponding upper (or lower) biasing circuit and the voltage between the emitter and base of the first transistor determine the magnitude of the switch terminal voltage. Generally, there is little change for the voltage between the emitter and base, thus the voltage of the corresponding upper (or lower) biasing circuit controls the magnitude of the switch terminal voltage. Therefore in this embodiment, by rationally configuring the biasing circuit and the type of the first transistor, it is possible to set the switch terminal voltage to be less than 1V and greater than 0V when the switch is opened and a conductive aqueous solution exists inside the switch. In this embodiment, two resistors are employed to constitute the biasing circuit of the transistor, however, it is obvious that any combination of the electronic components capable of achieving a voltage-dividing biasing circuit can be applied to this embodiment. For example, a combination of several resistors, a combination of a resistor and a diode, and a combination of a resistor and Zener diode and the like are possible.

The above analysis proves that the turn-on characteristic of the transistor can be utilized to reduce the terminal voltage at the two terminals of the switch when it is opened, especially, when the switch is opened and the inside of the switch has a conductive aqueous solution or the stream of the aqueous solution or a mixture of the conductive aqueous solution and the stream of the aqueous solution, the turn-on characteristic of the transistor can be utilized to effectively reduce the switch terminal voltage and the internal current. According to electrochemical theory, sufficiently low voltage and sufficiently low current could inhibit the electrochemical reaction between the electrolyte and the switch.

FIG. 5 is a schematic diagram of a circuit for reducing the switch terminal voltage according to an embodiment of the present invention. The circuit comprises:

(1) a power supply $U_{51}$ for supplying an operating voltage to the circuit;

(2) a switch signal unit comprising a first transistor $Q_{51}$ for outputting a switch signal according to the state of a switch $K_{51}$, wherein the switch $K_{51}$ is coupled between the first transistor $Q_{51}$ and the output of the power supply $U_{51}$, and is used to control the close-open of the current path between the first transistor $Q_{51}$ and the output of the power supply $U_{51}$;

(3) a biasing unit constituted by the resistors $R_{51}$ and $R_{52}$ in series, the resistors $R_{51}$ and $R_{52}$ are respectively coupled to the output of the power supply $U_{51}$ and the switch signal unit to output a bias voltage to the switch signal unit, that is to say, the node of the resistors $R_{51}$ and $R_{52}$ is coupled to the base of the transistor $Q_{51}$;

(4) a signal analysis module IC5 coupled to the collector of the first transistor $Q_{51}$, which is used to output a corresponding control signal according to the switch signal output from the collector of the first transistor $Q_{51}$;

(5) a output module comprising a second transistor $Q_{52}$ and an electrical motor $M_{51}$, the output module determines whether to start the electrical motor $M_{51}$ according to the control signal output from the signal analysis module IC5.

As can be seen from FIG. 5, the voltage across the switch $K_{51}$ is determined by the type of the transistor $Q_{51}$ (i.e., the first transistor) and the biasing unit, as shown by expression (2):

$$U_{K51} = \frac{R_{51}}{R_{51} + R_{52}} \cdot U_{51} - V_{EB} \qquad (2)$$

Where $U_{K51}$ is the voltage across the switch $K_{51}$, $V_{EB}$ is the absolute value of the voltage of the PN junction between the emitter and base of the transistor $Q_{51}$.

Therefore, by rationally configuring the biasing unit and the transistor $Q_{51}$, it is possible to set the voltage across the switch $K_{51}$ to be less than 1V and greater than 0V when the switch $K_{51}$ is opened and the inside of the switch $K_{51}$ has a conductive solution and/or stream.

For the purpose of the transistor $Q_{51}$ being turned on when the switch $K_{51}$ is closed, the output voltage of the biasing unit is configured to be greater than $V_{EB}$, so that the voltage $U_{K51}$ can be greater than 0V. It could be appreciated by one skilled in the art that, for the transistors of the same type, $V_{EB}$ has little change in its value, therefore, the output voltage of the biasing unit determines the value of the voltage $U_{K51}$.

As compared with FIG. 1, a transistor $Q_{51}$ is coupled in series in the current path from switch $K_{51}$ to the power supply $U_{51}$ in FIG. 5. When the switch $K_{51}$ is closed, the emitter current flowing through the switch $K_{51}$ is $I_E = I_{EB} + I_{EC}$, where $I_{EC} + I_{R53} + I_{IC}$, i.e. the collector current would flow into the power supply $U_{51}$ through the resistor $R_{53}$ and IC5 respectively.

The explanation to the operating principle of the circuit of FIG. 5 is as follows:

(1) When $K_{51}$ is opened, $Q_{51}$ is not turned on, the level of I/O$^{51}$ is the voltage of $R_{53}$, and at this point, the level of I/O$^{51}$ is a low level.

(2) When $K_{51}$ is closed for more than 100 ms, $Q_{51}$ is effectively turned on, $R_{53}$ will pull up the potential at the collector until the potential is greater than 0.7 $U_{51}$, that is, the level of I/O$^{51}$ can be identified as a high level, IC5 detects an abrupt change of the level of I/O$^{51}$ from a low level to a high level, and determines that the switch is effectively triggered by the user, then a high level will be output at I/O$^{52}$ so as to drive the field effect transistor $Q_{52}$ and thus start the electrical motor $M_{51}$. When the user opens the switch $K_{51}$, the $Q_{51}$ is turned off, I/O$^{51}$ restores from a high level back to a low level, the level of I/O$^{51}$ is changed from a high level to a low level, IC5 would thus determine that the switch $K_{51}$ is released, IC5 maintain the electrical motor to operate. When the switch $K_{51}$ is again closed for more than 100 ms, the level of I/O$^{51}$ is again abruptly changed from a low level to a high level, IC5 determines that the switch is triggered by the user once again, IC5 changes the output of I/O$^{52}$ from a high level to a low level, thereby the field effect transistor $Q_{52}$ and the electrical motor $M_{51}$ are turned off. The processes are cycled in this way to repeat the operation.

A detailed description will be made in the following on how to configure the biasing circuit and the load resistor $R_{53}$:

When $K_{51}$ is opened in the dry air, due to the $Q_{51}$ being not turned on, the voltage across the resistor $R_{53}$ is 0V, when $K_{51}$ is closed in the dry air, $K_{51}$ is shorted, and the resistor across the switch $K_{51}$ is 0Ω. According to the turn-on characteristic of the transistor and the biasing unit, a voltage relationship can be obtained as shown in expression (3):

$$\begin{cases} U_{51} = i_{51}R_{51} + (i_{b51} + i_{51})R_{52} \\ i_{b51} = I_s\left(e^{\frac{(U_{eb}-U_d)}{0.026}} - 1\right) \\ U_{eb} = i_{51}R_{51} \\ U_{eb} > U_d \end{cases} \quad (3)$$

Where $I_s$ is the reverse saturation current of the NP junction between the base and emitter of the transistor, $U_d$ is the turning-on threshold voltage of the NP junction. Generally, $i_{b51}$ is far less than $i_{51}$, therefore the influence of $i_{b51}$ is negligible in the calculating process, silicon tube transistor $U_d$ is usually in the order of 0.5V.

Based on expression (3), it could obtained that the resistance values of $R_{51}$ and $R_{52}$ satisfy the following relationship:

$$R_{51} \geq \frac{0.5}{U_{51} - 0.5} R_{52} \quad (4)$$

In this embodiment, it is assumed that $R_{52}$=120 KΩ, $U_{51}$=3V, then $R_{51} \geq 24$ kΩ.

Figure 6:
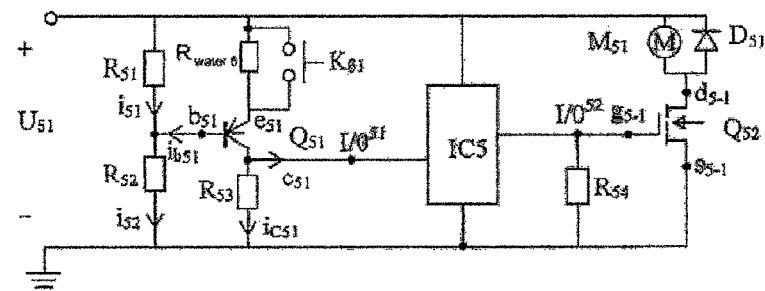
FIG. 6 is an equivalent circuit diagram when the inside of the switch shown in FIG. 5 has an aqueous solution.

FIG. 6 is an equivalent circuit diagram when the inside of the switch shown in FIG. 5 has an aqueous solution.

When the inside of the switch $K_{51}$ has a conductive aqueous solution, it is equivalent to an ideal switch $K_{61}$ and an equivalent resistance $R_{water\ 6}$ in parallel. To ensure an effective work of the switch, and also to avoid that the switch issues an erroneous switch signal to IC5 when the switch has a conductive aqueous solution therein, it is required that, when the switch is opened, the level at the I/O port connecting IC5 and the switch signal should be a low level, but when the switch is effectively closed, the level at the I/O port connecting IC and the switch signal should be a high level.

When the inside of the switch $K_{51}$ has an aqueous solution and the switch $K_{51}$ is opened, based on the branch constituted with the resistor $R_{water\ 6}$, the transistor $Q_{51}$ and the resistor $R_{53}$, the following voltage relationship can be obtained:

$$\begin{cases} U_{51} = U_{Rwater\ 6} + U_{ec} + U_{R53} \\ U_{K61} = U_{Rwater\ 6} = (i_{b51} + i_{c51})R_{water\ 6} \\ U_{R53} = i_{c51} \cdot R_{53} < 0.3U_{51} \end{cases} \quad (5)$$

It should be appreciated that, by setting the load resistor $R_{53}$ to be less than the equivalent resistance $R_{water\ 6}$, when $(i_{b51}+I_{c51})R_{water\ 6}<0.3U_{51}$, $I_{C51}R_{53}$ is sure to be less than 0.3 $U_{51}$.

Therefore, the range of the resistor $R_{53}$ can be obtained:

$$R_{53} < \frac{0.3 U_{51} R_{water\ 6}}{U_{K61}} \quad (6)$$

In order that $U_{k61}$ can be less than 1V when the power supply voltage is 2-3V in this circuit, it is assumed that the maximal value $U_{k61max}$ of $U_{k61}$ is 1V, the minimal value $U_{51min}$ of $U_{51}$ is 2V, and the minimal value $R_{water\ 6min}$ of $R_{water\ 6}$ is 40 KΩ, then the resistor $R_{53}$ is in a range as follows:

$$R_{53} < \frac{0.3 U_{61\ min} R_{water\ 6\ min}}{U_{K61max}} = 24 \text{ K}\Omega \quad (7)$$

When the switch $K_{61}$ is closed, $R_{water\ 6}$ is shorted, the following voltage relationship is obtained:

$$\begin{cases} U_{R53} = R_{53} \cdot i_{c51} \\ U_{51} = U_{ec51} + U_{R53} \end{cases} \quad (8)$$

Obviously, by this time, the resistor $R_{53}$ will pull up the potential at the collector of the transistor $Q_{51}$, and according to the turn-on characteristic of the transistor, usually when $U_{ec51}<0.7V$, $i_{b51}$ and $I_{C51}$ are in an approximately linear relationship as shown in expression (9):

$$\begin{cases} i_{c51} = \beta_{51} i_{b51} \\ \dfrac{U_{ec51}}{0.7} = \dfrac{\beta_{51}}{\beta_{510}} \end{cases} \quad (9)$$

When $U_{ec51}>0.7V$, $I_{C51}=\beta_{510}i_{b51}$, where $\beta_{510}$ is the direct current magnification of the transistor, $\beta_{51}$ is a transient direct current magnification of the transistor when $U_{ec}<0.7V$.

According to the aforesaid definition of the high level, it is required that $U_{R53}>0.7U_{51}$, thus $U_{ec51}<0.3U_{51}$; In order to ensure the sensitivity of the switch signal, $U_{ec51}<0.6V$ is usually required.

In general, when the output voltage of the power supply is greater than its output cut-off voltage $U_{519}$, it is required to maintain the normal operations of the electrical motor, by this time, first transistor has its $U_{ec51}<0.3U_{519}$.

Preferably, in order to make the circuit even more safe, it may be assumed that $U_{ec51} \leq 0.24\ U_{519}$. Accordingly, the following relationship can be obtained:

$$\beta_{51} \leq \frac{12\beta_{510}U_{519}}{35} \quad (10)$$

$$R_{53} > \frac{133}{60\beta_{510}i_{b53}} \quad (11)$$

Obviously, when the power supply outputs the cut-off voltage $U_{519}$, the transistor base current is a minimal value (i.e., $i_{b519}$), the numeric range of $R_{53}$ can be adjusted as:

$$R_{53} > \frac{133}{60\beta_{510}i_{b519}} \quad (12)$$

In summary, the numeric range of the resistor $R_{53}$ is:

$$\frac{133}{60\beta_{510}i_{b519}} < R_{53} < \frac{0.3U_{51\,min}R_{water\,6\,min}}{U_{K61max}} \quad (13)$$

In this embodiment, the transistor $Q_{51}$ is of 9014 type, then corresponding numeric range of $R_{53}$ is: 11.07 K$\Omega$<$R_{53}$<24 K$\Omega$ Further, in order to stabilize the operation of the circuit, it is also needed to further limit the base current $i_{b519}$ when the circuit operates at the power supply cut-off voltage $U_{519}$. A is preset to be the multiplying factor of current $i_{519}$ flowing through the resistor $R_{51}$ than the base current $i_{b519}$ on this condition, i.e. A=$i_{519}$/$i_{b519}$, usually assumed that A is 100. As can be seen based on the bipolar transistor characteristics, when $i_{b519}$26 10$i_s$, the following relationship can be obtained approximately:

$$\begin{cases} U_{519} = i_{519}(R_{51} + R_{52}) + i_{b519}R_{52} > (i_{519} + i_{b519}) \cdot (R_{51} + R_{52}) \\ i_{b519} \approx i_s\left(e^{\frac{(U_{eb519}-U_d)}{0.026}} - 1\right) \end{cases} \quad (14)$$

To make the switch terminal voltage to be less than 1V, the relationship shown by expression (15) must be satisfied:

$$i_{51}R_{51} - U_{eb} < 1V \quad (15)$$

With expressions (14) and (15), it is possible to determine the range of $R_{51}$ $$R_{51} \geq \frac{R_{52}(U_d + 0.026\ln 11)}{(U_{519} - 10i_sR_{52} - U_d - 0.026\ln 11)} \quad (16)$$

Moreover, the total resistance of the biasing circuit is in a range:

$$R_{51} + R_{52} \leq \frac{U_{519}}{Ai_s} \quad (17)$$

When the output voltage of the power supply is at its maximal value $U_{518}$, it is required that an aqueous solution exists inside the switch and the terminal voltage of the opened switch is less than nV, then the following relationship can be obtained:

$$\begin{cases} U_{518} = i_{518}(R_{51} + R_{52}) + i_{b518}R_{52} \\ i_{b518} = i_x\left(e^{\frac{(U_{eb518}-U_d)}{0.026}} - 1\right) \\ i_{518}R_{51} \leq U_{eb518} + n \\ i_{b518} \geq 10i_s \end{cases} \quad (18)$$

By the expression (18), it is possible to get the numeric range of $R_{51}$ in the case of the maximal value $U_{518}$ of the output voltage of the power supply, and further in conjunction with expression (16), the numeric range of resistor $R_{51}$ can be determined as follows:

$$\frac{R_{52}(U_d + 0.026\ln 11)}{(U_{519} - 10i_sR_{52} - U_d - 0.026\ln 11)} \leq \quad (19)$$

$$R_{51} \leq \frac{R_{52}(U_d + 0.026\ln 11 + n)}{(U_{518} - 10i_sR_{52} - U_d - 0.026\ln 11 - n)}$$

Further, the range of the resistor $R_{53}$ can be determined:

$$\frac{133}{60\beta_{510}i_{b519}} \leq R_{53} \leq \frac{0.3U_{51\,min}R_{water\,6\,min}}{U_{K61max}} \quad (20)$$

In this embodiment, it is assumed that $U_{519}$=2V, $U_d$=0.5V, $U_{518}$=3V, $\beta_{510}$=200, $i_s$=0.0001 mA, $R_{52}$=120 K$\Omega$, n=1V, A=100, then the range of $R_{51}$ is as follows:

$$51.21 \text{ K}\Omega \leq R_{51} \leq 142.28 \text{ K}\Omega \quad (21)$$

$$R_{51} > \frac{0.5R_{52}}{U_{51} - 0.5} = 24 \text{ K}\Omega \quad (22)$$

Thus, according to expressions (20), (21) and (22), it can be obtained that $R_{51}$=56 K$\Omega$, $R_{52}$=120 K$\Omega$, $R_{53}$=18 K$\Omega$.

The above computation process proves that the circuit of FIG. 5 can match with suitable transistor $Q_{51}$, resistor $R_{51}$-$R_{53}$. Based on the above configuration, the level variation at the I/O port connecting IC5 to the switch signal can exactly reflect the opening or closing action of the switch, and at the same time, the switch terminal voltage is set to be less than 1V when the switch is in its open state, thus the electrochemical reaction inside the switch is greatly depressed and the switch life is prolonged.

FIG. 7 is a schematic diagram of another circuit for reducing the switch terminal voltage according to an embodiment of the present invention. As compared with FIG. 3, a transistor $Q_{71}$ (i.e., the first transistor) is coupled in series on the current path from the switch $K_{71}$ to the power supply. The resistors $R_{71}$ and $R_{72}$ constitute a biasing circuit for supplying a bias voltage to the base of the transistor $Q_{71}$.

FIG. 7 is a circuit diagram of the circuit of FIG. 3 improved in conjunction with the present invention, the switch of FIG. 7 is in the dry air. As compared with FIG. 3, a transistor $Q_{71}$ is coupled in series on the current path from the switch $K_{71}$ to the power supply. When the switch $K_{71}$ is closed, a part of the current from the power supply flowing through $K_{71}$ passes through the PN junction between the emitter and base of the transistor, through the resistor $R_{72}$ and then into the power supply, while another part of the current flowing through $K_{71}$ passes through the PN junction and NP junction between the emitter and collector of the transistor, through the electrical motor $M_{71}$, and then into the power supply. Obviously, the current from the power supply in FIG. 3 passes through the switch $K_{31}$ and the electrical motor $M_{31}$ and directly returns back into the power supply, no PN junction or NP junction of a transistor is coupled in series on the current path from the switch $K_{31}$ to the power supply. $R_{71}$ and $R_{72}$ in FIG. 7 constitute a biasing circuit of the transistor $Q_{71}$, the bias part close to the positive pole of the power supply is the upper biasing circuit, while the bias part close to the negative pole of the power supply is the lower bias part, that is, $R_{71}$ is the upper bias part, $R_{72}$ is the lower bias part. In FIG. 7, one terminal of the switch $K_{71}$ is electrically connected to the emitter of the transistor $Q_{71}$, the switch $K_{71}$ is coupled in series with the PN junction between the emitter and base of the transistor $Q_{71}$, constituting a first series circuit, and such a series circuit is coupled in parallel with the upper bias part ($R_{71}$) of the biasing circuit of the transistor $Q_{71}$.

The operating principle of the circuit of FIG. 7 is as follows:

The switch $K_{71}$ is in the dry air, when the switch $K_{71}$ is opened, $Q_{71}$ is not turned on, the electrical motor $M_{71}$ cannot operate. When the switch $K_{71}$ is closed, $Q_{71}$ is turned on, the electrical motor $M_{71}$ operates, and the electrical appliances operate. When the switch $K_{71}$ is opened once again, the transistor $Q_{71}$ is turned off once again, the electrical motor $M_{71}$ stops working.

Figure 8:
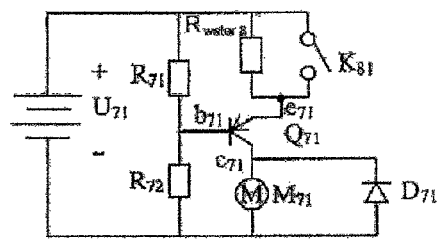
FIG. 8 is an equivalent circuit diagram when the inside of the switch shown in FIG. 7 has an aqueous solution.

FIG. 8 is an equivalent circuit diagram when the inside of the switch shown in FIG. 7 has an aqueous solution. At this point, the switch $K_{71}$ is equivalent to an ideal switch $K_{81}$ and an equivalent resistance $R_{water\ 8}$ in parallel. When the switch $K_{81}$ is opened, the voltage relationship can be obtained as follows:

$$U_{R71} = U_{K81} + U_{eb71} = U_{R_{water\ 8}} + U_{eb71} \qquad (23)$$

$$U_{71} = U_{R71} + U_{R72} = U_{M71} + U_{ec71} + (i_{b71} + i_{c71})R_{water\ 8} \qquad (24)$$

Generally, $R_{water\ 8}$ is tens of thousands ohms, but the equivalent resistance of the electrical motor $M_{71}$ is a few ohms to more than ten ohms, so that when the switch $K_{81}$ is opened, $U_{K81}$ is far greater than $U_{M71}$. By rationally configuring $R_{71}$ and $R_{72}$ in the aforesaid method, the voltage across the switch $K_{81}$ can be made to be less than 1V and greater than 0V, and accordingly, $U_{M71}$ is at least less than 0.1V, the electrical motor $M_{71}$ will not work. When a conductive aqueous solution exists inside the switch $K_{81}$ and the switch is closed, the transistor $Q_{71}$ is turned on to work, $U_{ec71}$ is very low, hence the electrical motor $M_{71}$ obtains a high voltage, and the electrical motor starts to work. When the switch is opened again, due to the switch terminal voltage being less than 1V and greater than 0V as well as far greater than $U_{M71}$, therefore, $U_{M71}$ is at least less than 0.1V, the electrical motor cannot be started.

FIG. 9 is a schematic diagram of another circuit for reducing the switch terminal voltage according to an embodiment of the present invention.

As compared with FIG. 3, a transistor $Q_{91}$ (i.e., the first transistor) is coupled in series on the current path from the switch $K_{91}$ to the power supply, and the resistors $R_{91}$ and $R_{92}$ constitute the biasing circuit of the transistor $Q_{91}$. The collector of the transistor $Q_{91}$ is coupled to the gate of the field effect transistor $Q_{92}$ (that is, the second transistor), so as to provide the switch signal of the MOS transistor $Q_{92}$, thus to control the operation state of the electrical motor $M_{91}$.

When the switch $K_{91}$ is in the dry air and the switch $K_{91}$ is opened, the transistor $Q_{91}$ isn't turned on, the gate of the field effect transistor $Q_{92}$ is at 0V, the field effect transistor $Q_{92}$ is turned off, the electrical motor doesn't work. When the switch $K_{91}$ is closed, the transistor $Q_{91}$ is turned on, the resistor $R_{93}$ pulls up the collector potential of the transistor $Q_{91}$ close to the power supply voltage, thus the field effect transistor $Q_{92}$ is turned on, the electrical motor $M_{91}$ works. When the switch $K_{91}$ is opened once again, the transistor $Q_{91}$ is turned off once again, the electrical motor $M_{91}$ stops working.

Figure 11:
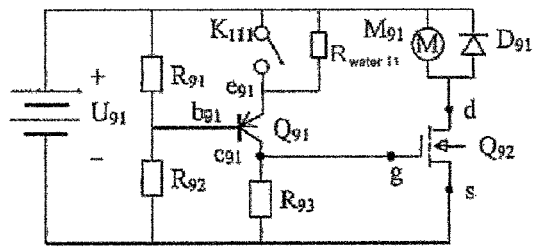
FIG. 11 is an equivalent circuit diagram when the inside of the switch shown in FIG. 9 has an aqueous solution.

When the inside of the switch has a conductive aqueous solution, the switch $K_{91}$ is equivalent to an ideal switch $K_{111}$ and an equivalent resistance $R_{water\ 11}$ in parallel. FIG. 11 is an equivalent circuit diagram when the inside of the switch $K_{91}$ of FIG. 9 has an aqueous solution.

When the aqueous solution exists inside the switch $K_{91}$, the voltage relationship in the case of the switch $K_{91}$ being opened is as shown in expressions (25) and (26):

$$U_{R91} = U_{K111} + U_{eb91} = U_{R_{water\ 11}} + U_{eb91} \qquad (25)$$

$$U_{91} = U_{R91} + U_{R92} = U_{R93} + U_{ec91} + (i_{b91} + i_{c91})R_{water\ 11} \qquad (26)$$

Similarly, by configuring the resistor $R_{91}$-$R_{93}$ according to aforesaid methods, it is possible that, when the switch is opened, the switch terminal voltage is less than 1V and greater than 0V, and accordingly, the voltage of the resistor $R_{93}$ is less than 1V. In general, the turn-on threshold voltage of the field effect transistor $Q_{92}$ satisfies $V_{gs} > 1.5V$, therefore, the field effect transistor $Q_{92}$ cannot be turned on, and the electrical motor $M_{91}$ cannot work. At the same time, due to the switch terminal voltage being less than 1V, the current flowing through the switch is greatly reduced, thus the low switch terminal voltage and the small current enormously inhibit the electrochemical reaction inside the switch, thereby the switch life is prolonged.

When a conductive aqueous solution exists inside the switch and the switch is closed, $Q_{91}$ is effectively turned on, at this point, the power supply voltage is equal to the sum of the voltage of the transistor $Q_{91}$ and the voltage of the resistor $R_{93}$. By configuring the resistor $R_{91}$-$R_{93}$, it is possible to make $U_{R93}$ close to the power supply voltage, thus the field effect transistor is turned on to drive the electrical motor $M_{91}$.

In summary, by properly configuring $R_{91}$-$R_{93}$ in FIGS. 9 and 11, it is possible to make the switch terminal voltage to be less than 1V and greater than 0V and keep the electrical motor out of work when the inside of the switch has a conductive aqueous solution and the switch is opened. When the switch is closed, the electrical motor can be started normally. Due to the switch terminal voltage being less than 1V when the switch is opened, which greatly depresses the electrochemical reaction of the switch, thus the switch life is enormously prolonged and the possibility of hydrogen explosion is eliminated.

Figure 12:
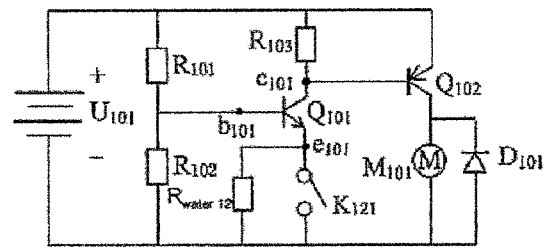
FIG. 12 is an equivalent circuit diagram when the inside of the switch shown in FIG. 10 has an aqueous solution.

FIG. 10 is a schematic diagram of another circuit for reducing the switch terminal voltage according to an embodiment of the present invention, FIG. 12 is an equivalent circuit diagram when the inside of the switch shown in FIG. 10 has an aqueous solution.

As shown in FIG. 10, the switch $K_{101}$ is in the dry air. As compared with FIG. 3, a transistor $Q_{101}$ (i.e., the first transistor) is coupled in series on the current path from the switch $K_{101}$ to the power supply. When the switch $K_{101}$ is closed, a part of the current from the power supply flows through $R_{101}$, through the PN junction between the base and emitter of the transistor, through $K_{101}$, and then into the power supply; while another part of the current flowing through $K_{101}$ originates from the current that flows through the resistor $R_{103}$, the NP junction and PN junction between the emitter and collector of the transistor, and then returns back into the power supply. Therefore, on the current path from the switch $K_{101}$ to the power supply, the PN junction between the base and emitter of the transistor $Q_{101}$ as well as the NP junction and PN junction between the collector and emitter of the transistor are coupled in series. $R_{101}$ and $R_{102}$ in FIG. 10 constitute a biasing circuit of the transistor $Q_{101}$, the bias part close to the positive pole of the power supply is the upper biasing circuit, while the bias part close to the negative pole of the power supply is the lower bias part, that is, $R_{101}$ is the upper bias part, $R_{102}$ in is the lower bias part. The switch $K_{101}$ is coupled in series with the NP junction between the emitter $e_{101}$ and base $b_{101}$ of the transistor $Q_{101}$ (i.e., the first transistor), constituting a second series circuit which is coupled in parallel with the lower bias part ($R_{102}$) of the biasing circuit of the transistor $Q_{101}$.

By configuring the resistor $R_{121}$-$R_{123}$ according to aforesaid methods, when the switch $K_{101}$ is in the dry air and being opened, the transistor $Q_{101}$ isn't turned on and its collector potential $U_{C101}$ is equal to the power supply voltage $U_{101}$, therefore, the transistor $Q_{102}$ (i.e., the second transistor) isn't turned on, the electrical motor cannot work. When the switch $K_{101}$ is closed, the transistor $Q_{101}$ is turned on, $U_{C101}$ is reduced, thus the transistor $Q_{102}$ is turned on, the electrical motor $M_{101}$ works. When the inside of the electrical appliances switch has a conductive aqueous solution, the switch $K_{101}$ is equivalent to an ideal switch $K_{121}$ and an equivalent resistance $R_{water\ 12}$ in parallel.

When the inside of the switch $K_{101}$ has an aqueous solution and the switch $K_{101}$ is opened, $$U_{R102}=U_{K121}+U_{be121}=U_{R_{water\ 12}}+U_{be121} \quad (27)$$

$$U_{101}=U_{R103}+U_{ce101}+(i_{b101}+i_{c101})R_{water\ 12} \quad (28)$$

By configuring the resistor $R_{101}$-$R_{103}$ according to aforesaid methods, for example, assuming $U_{101max}$=3V and $R_{101}$=120 KΩ, $R_{102}$=56 KΩ, $R_{103}$=18 KΩ, it is possible to make the voltage across the switch to be less than 1V, and accordingly, $U_{R103}$ is at least less than 0.5V, therefore, the transistor $Q_{102}$ cannot be turned on, the electrical motor $M_{101}$ cannot work. Due to $U_{K121}$ being less than 1V, the current flowing through the switch is greatly reduced, thus the low switch terminal voltage and the small current enormously inhibit the electrochemical reaction inside the switch, thereby the switch life is prolonged.

When a conductive aqueous solution exits inside the switch $K_{121}$ and the switch is closed, $U_{K121}$=0V, based on the above configuration of the resistor $R_{101}$-$R_{103}$, when the switch is closed, the transistor $Q_{101}$ is effectively turned on, and $U_{R103}$>0.7V can be obtained, thus the transistor $Q_{102}$ is effectively turned on, a high voltage is achieved on the electrical motor $M_{101}$, and the electrical motor starts to work.

In summary, by properly configuring $R_{101}$-$R_{103}$, it is possible to make the switch terminal voltage to be less than 1V and keep the electrical motor out of work when the inside of the switch has a conductive aqueous solution and the switch is opened. When the switch is closed, the electrical motor can be started normally. In a similar way, due to the switch terminal voltage being less than 1V when the switch is opened, the electrochemical reaction of the switch is greatly inhibited, thus enormously prolonging the switch life and at the same time avoiding the possibility of hydrogen explosion.

The present invention also discloses an electrical appliance, such as an electric toothbrush, the electrical appliance comprises: (1) a power supply for supplying operating voltage to the electrical appliance, which is generally a rechargeable battery or dry battery (2) a switch module coupled to the power supply for controlling the close-open of the current path between the power supply and subsequent circuits; (3) an electrical motor coupled to the switch module and the power supply for determining whether to drive the brush head to work according to the control of the switch.

Based on the above configuration, the electrical appliance can ensure the validity of the switch in a wet environment, prolonging the switch life.

It should be understood by one skilled in the art that the above embodiments are merely used to set forth the concept of the present invention and exemplary circuits, rather than to limit the protection scope of the present invention. For example, the switch can be coupled in series with the emitter of the transistor through a resistor so that the voltage that can be assigned to the switch is reduced; the biasing unit can be constituted by a linear voltage regulator, a switching power supply or other circuits capable of outputting the specific bias voltage.

It should also be understood by one skilled in the art that the first transistor in the above embodiments, for example $Q_{51}$, can also be a field effect transistor. In such a case, one terminal of the switch is coupled to the source of the first transistor, the switch is coupled in series with the NP junction between the gate and source of the first transistor to form a first series circuit, and the first series circuit is coupled in parallel with the upper bias part of the biasing unit; or the switch is coupled in series with PN junction between the gate and source of the first transistor to form a second series circuit, the second series circuit being coupled in parallel with the lower bias part of the biasing unit.

The above description of the present disclosure is used to enable any ordinary skilled in the art to achieve or use the present invention. Various modification of the present disclosure is obvious to the ordinary skilled in the art, and generic principles defined herein can also be applied to other variations without departing from the spirit and protection scope of the present invention. Therefore, the present invention is not limited to the examples and designs described herein, but are to be consistent with the broadest scope of the principles and novel features disclosed herein.

What is claimed is:
1. A device with controllable switch terminal voltage, comprising:
   a switch signal unit for outputting a corresponding switch signal according to a state of a switch, the switch signal unit comprises a first transistor, the switch is coupled between the first transistor and a power supply for controlling close-open of a current path between the first transistor and the power supply;
   a biasing unit coupled to the switch signal unit for outputting a bias voltage to the switch signal unit, the biasing unit comprises a bottom bias part and an upper bias part on top of the bottom bias part;
   wherein when the switch is open and a conductive liquid and/or a stream of a conductive liquid exists inside the switch, the biasing unit cooperates with the switch signal unit so as to control a terminal voltage of the switch and a current flowing through the switch;
   wherein the first transistor is a bipolar transistor, one terminal of the switch is coupled to an emitter of the first transistor, wherein the switch is coupled in series with a PN junction between the emitter and a base of the first transistor so as to form a first series circuit, the first series circuit is coupled in parallel with the upper bias part of the biasing unit or the switch is coupled in series with a NP junction between the emitter and base of the first transistor so as to form a second series circuit, the second series circuit is coupled in parallel with the bottom bias part of the biasing unit.

2. The device according to claim 1, wherein the first and second series circuits further comprise at least one resistor.

3. The device according to claim 1, wherein, when the switch is opened,
if a conductive liquid and/or the stream of the conductive liquid exists inside the switch, the first transistor is in a turn-on state;
if the inside of the switch is dry, the first transistor is in a turn-off state.

4. The device according to claim 1, wherein the device further comprises an electrical motor coupled to an output of the switch signal unit.

5. The device according to claim 1, wherein the device further comprises:
an output module comprising a second transistor and an electrical motor coupled in series with the second transistor;
wherein the output module is coupled to an output of the switch signal unit, and an operation state of the electrical motor is configured based on an output signal of the switch signal unit.

6. The device according to claim 5, wherein the second transistor is a field effect transistor, wherein the electrical motor is coupled in series to a drain of the second transistor.

7. The device according to claim 5, wherein the second transistor is a bipolar transistor, wherein the electrical motor is coupled in series to the collector of a second transistor.

8. The device according to claim 1, wherein at least one pull-up resistor is coupled in series between an output of the switch signal unit and a ground.

9. The device according to claim 1, wherein the device further comprises a signal analysis module coupled between an output module and an output of the switch signal unit, so as to output a control signal for controlling the output module according to an output signal from the switch signal unit.

10. An electric toothbrush adopting a device with controllable switch terminal voltage, comprising:
a brush head coupled to an electrical motor, the electrical motor determines whether to drive the brush head to operate according to a control of a switch coupled between a switch signal unit and an output of a power supply;
the switch signal unit for outputting a corresponding switch signal according to a state of the switch, the switch signal unit comprises a first transistor, the switch is coupled between the first transistor and a power supply for controlling close-open of a current path between the first transistor and the power supply; and
a biasing unit coupled to the switch signal unit for outputting a bias voltage to the switch signal unit, wherein the biasing unit comprises a bottom bias part and an upper bias part on top of the bottom bias part;
wherein when the switch is open and a conductive liquid and/or a stream of a conductive liquid exists inside the switch, the biasing unit cooperates with the switch signal unit so as to control a terminal voltage of the switch and a current flowing through the switch;
wherein the first transistor is a bipolar transistor, one terminal of the switch is coupled to an emitter of the first transistor, wherein the switch is coupled in series with a PN junction between the emitter and a base of the first transistor so as to form a first series circuit, the first series circuit is coupled in parallel with the upper bias part of the biasing unit or the switch is coupled in series with a NP junction between the emitter and a base of the first transistor so as to form a second series circuit, the second series circuit is coupled in parallel with the bottom bias part of the biasing unit.

11. The electric toothbrush according to claim 10, wherein the first and second series circuits further comprise at least one resistor.

12. The electric toothbrush according to claim 10, wherein when the switch is opened,
if the conductive liquid and/or the stream of the conductive liquid exists inside the switch, the first transistor is in a turn-on state;
if the inside of the switch is dry, the first transistor is in a turn-off state.

13. The electric toothbrush according to claim 10, wherein the electric toothbrush further comprises an electrical motor coupled to an output of the switch signal unit.

14. The electric toothbrush according to claim 10, wherein the electric toothbrush further comprises
an output module comprising a second transistor and an electrical motor coupled in series with the second transistor;
wherein the output module is coupled to an output of the switch signal unit, and an operation state of the electrical motor is configured based on an output signal of the switch signal unit.

15. The electric toothbrush according to claim 14, wherein the second transistor is a field effect transistor, wherein the electrical motor is coupled in series to a drain of the second transistor.

16. The electric toothbrush according to claim 14, wherein the second transistor is a bipolar transistor, wherein the electrical motor is coupled in series to a collector of the second transistor.

17. The electric toothbrush according to claim 10, wherein at least one pull-up resistor is coupled in series between an output of the switch signal unit and a ground.

18. The electric toothbrush according to claim 10, wherein the electric toothbrush further comprises a signal analysis module coupled between an output module and an output of the switch signal unit, so as to output a control signal for controlling the output module according to an output signal from the switch signal unit.

* * * * *